United States Patent [19]

Nagashima et al.

[11] Patent Number: 4,692,774
[45] Date of Patent: Sep. 8, 1987

[54] MULTI-COLOR RECORDING APPARATUS

[75] Inventors: Masasumi Nagashima, Yokosuka; Mineo Nozaki, Kawasaki; Osamu Asakura, Tokyo; Yoshio Uchikata, Yokohama, all of Japan

[73] Assignee: Canon Kabushiki Kaisha, Tokyo, Japan

[21] Appl. No.: 831,049

[22] Filed: Nov. 14, 1985

Related U.S. Application Data

[63] Continuation of Ser. No. 564,407, Dec. 22, 1983, abandoned.

[30] Foreign Application Priority Data

Dec. 28, 1982 [JP] Japan ............................. 57-227582

[51] Int. Cl.$^4$ ............................................. G01D 15/10
[52] U.S. Cl. ............................... 346/76 PH; 400/240; 400/208.1; 346/106
[58] Field of Search ................ 346/76 R, 76 PH, 105, 346/106, 46; 219/216, 216 PH; 400/120, 240-240.4, 207-208.1, 191

[56] References Cited

U.S. PATENT DOCUMENTS 3,726,212  4/1973  Combs ........................... 346/76 PH
4,447,819  5/1984  Moriguchi et al. ............. 346/76 PH

FOREIGN PATENT DOCUMENTS 13193    2/1981  Japan ............................. 346/76 PH
0006786  1/1982  Japan ............................. 346/76 PH

OTHER PUBLICATIONS

I.B.M. Tech. Disclosure Bulletin, vol. 22, No. 7, Dec. 1979, by Baker and Dunn pp. 2633-2635.
"IBM Technical Disclosure Bulletin", vol. 22. No. 10, Mar. 1980, pp. 4481-4482.

Primary Examiner—Arthur G. Evans
Attorney, Agent, or Firm—Fitzpatrick, Cella Harper & Scinto

[57] ABSTRACT

A multi-color recording apparatus is provided with a feeding device for feeding a recording material of determined colors, a recording head for depositing the recording material supplied from the feeding device onto a recording sheet in a pattern corresponding to recording information a detector for detecting the color of the recording material supplied from the feeding device and a control for comparing color information contained in the recording information with the result of the detection by the detector and prohibiting the recording operation of the recording head when there is an absence of coincidence in the color of the recording material and the color information in the recording information.

15 Claims, 6 Drawing Figures

*FIG. 6*

| MEMORY | | | | |
|---|---|---|---|---|
| ADDRESS | IMAGE | IMAGE CODE | COLOR CODE | |
| 1 | a | 1234 | 001 | |
| 2 | i | 1235 | 001 | |
| 3 | u | 1236 | 001 | |
| 4 | e | 0000 | 000 | |
| 5 |   | 0000 | 000 | |
| 6 |   | 0000 | 000 | |
| 7 | ki | 1240 | 111 | |
| 8 | ku | 1241 | 111 | |

MULTI-COLOR RECORDING APPARATUS

This application is a continuation of application Ser. No. 564,407 filed Dec. 22, 1983, now abandoned.

BACKGROUND OF THE INVENTION

1. Field of the Invention

The present invention relates to a multi-color recording apparatus capable of multi-color recording.

2. Description of the Prior Art

There are already known various recording apparatus capable of multi-color recording. Such printers include various types of thermal printers, among them being a thermal printer utilizing a thermal transfer ink ribbon as the recording material, which has become popular in recent years.

The thermal transfer ink ribbon employed in such thermal printer is composed, for example as shown in FIG. 1, of a substrate 1 consisting of a polyester film or the like, on a face of which there is provided an ink layer 2, containing a dye or pigment such as carbon black, coated across a thermally fusible binder layer 3.

Printing with such a thermal transfer ink ribbon is achieved by energizing plural heat-generating elements of a thermal printing head in the thermal printer and bringing said heat-generating elements into contact with the uncoated face of the ribbon to transmit the heat thereto, thereby fusing the binder 3 and transferring the ink 2 onto a printing sheet.

In the thermal printer utilizing such thermal transfer ink ribbon, there is commonly used carbon black containing ink as the ink layer 2 for obtaining black prints, but other colors such as red, blue or yellow may also be printed by incorporating suitable dyes or pigments in the ink.

FIGS. 2 and 3 show examples of ink ribbon structure for use in such multi-color printing.

In the example shown in FIG. 2, the ink ribbon is divided transversely into plural areas 4, 5 and 6 which are respectively provided with inks of different colors, for example red, blue and yellow, respectively. Multi-color printing with such ink ribbon is achieved by shifting the ribbon vertically with respect to the thermal printing head in such a manner that the ink of a desired color corresponds to the thermal printing head.

In the example shown in FIG. 3, the ink ribbon is longitudinally divided into plural areas 7, 8, 9 of a determined length, which are respectively provided with red, blue and yellow inks.

With such an ink ribbon, multi-color printing is achieved by advancing said ribbon until the ink of a desired color corresponds the thermal printing head.

The ink ribbon shown in FIG. 2 is however associated with the drawbacks that a mechanism for vertically shifting the ink ribbon is required in the thermal printer, which increases the dimension of the printer because the width of the ink ribbon becomes larger, and that the ink ribbon is uneconomical because the inks other than that of the printed color remain unused and are thus wasted.

Also the ink ribbon shown in FIG. 3 is likewise uneconomical if printing of a particular color continues, since the inks of other colors are not used and wasted.

Multi-color recording has become also common in the field of ink jet printing, in which liquid inks are used as recording materials and are emitted in the form of droplets to achieve dot recording. Also in this type of recording, if the inks of different colors, for example black and red, are held in a cartridge, either remaining ink has to be discarded if the other ink in the cartridge runs out.

SUMMARY OF THE INVENTION

An object of the present invention is to provide a multi-color recording apparatus capable of efficient multi-color recording without waste of materials.

Another object of the present invention is to enable multi-color recording with a simplified recording operation and with reduced recroding time.

Still another object of the present invention is to enable secure and efficient switching of the recorded color.

Still another object of the present invention is to provide a thermal printer capable of multi-color recording with a simple structure.

Still another object of the present invention is to provide a multi-color recording apparatus for serial recording, capable of efficient multi-color recording.

Still another object of the present invention is to provide a multi-color recording apparatus capable of efficient multi-color recording through the efficient use of memory means.

Still other objects of the present invention will become fully apparent from the following description.

BRIEF DESCRIPTION OF THE DRAWINGS

FIG. 6 is a schematic view showing the memory map after the recording of a first color.

DETAILED DESCRIPTION OF THE PREFERRED EMBODIMENTS

Figure 1:
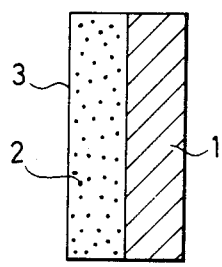
FIG. 1 is a vertical cross-sectional view showing the general structure of a thermal transfer ink ribbon.
Figure 2:
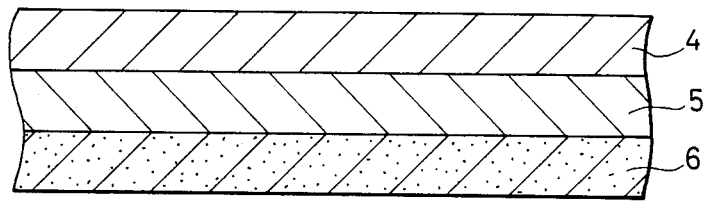
FIGS. 2 and 3 are schematic views showing the structures of conventional multi-color ink ribbons.
Figure 3:
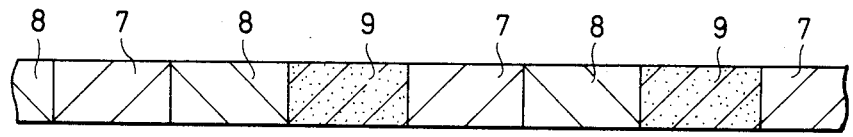
Figure 4:
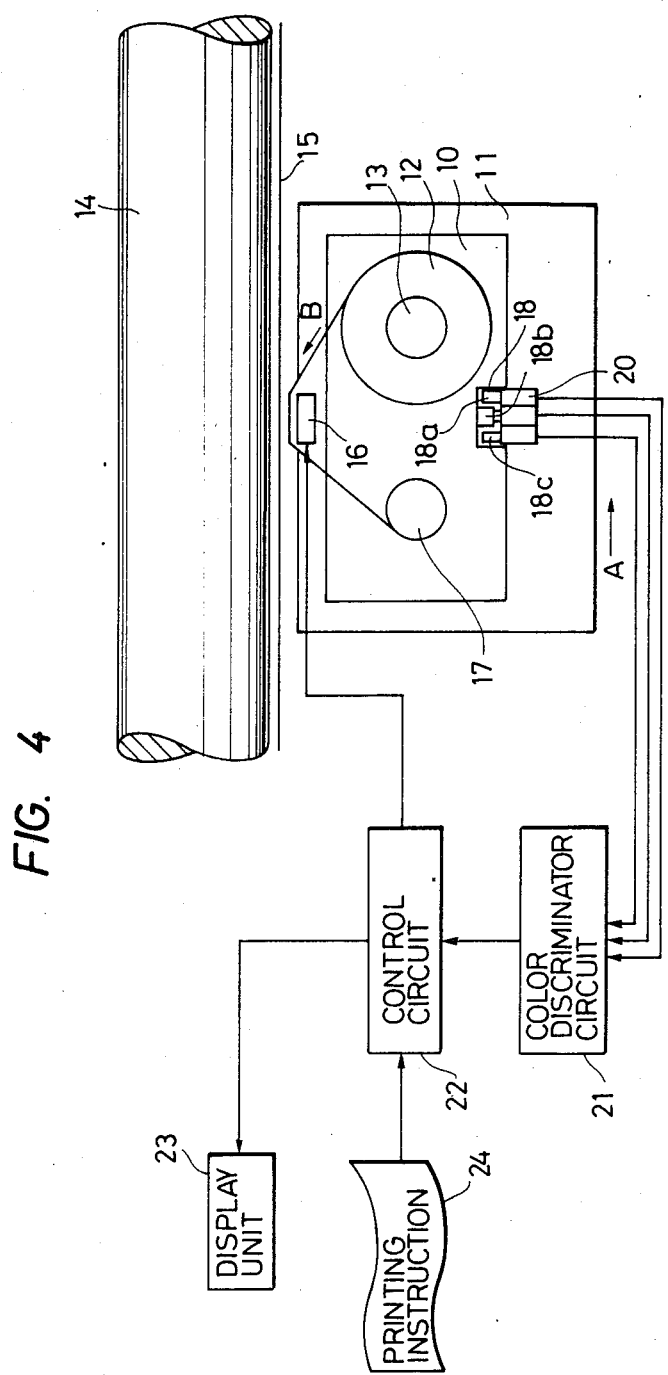
FIG. 4 is a schematic block diagram showing an embodiment of the present invention.

FIG. 4 shows an embodiment of the present invention wherein an ink ribbon cassette 10 serves as the supply means for housing and feeding an ink ribbon 12 used as the recording material. There will be provided plural ink ribbon cassettes at least containing red, blue and yellow ribbons, respectively. A carriage 11 supports a thermal recording head for pattern recording on a recording sheet 15 according to recording information and an ink ribbon cassette 10, and serves as carrying means for conducting reciprocating motion along a platen 14 around which the recording sheet 15 is wound. The ink ribbon cassette 10, when mounted on the carriage 11, engages with an unrepresented driving gear provided thereon, whereby the ink ribbon 12 is advanced in a direction B from a supply reel 13 to a take-up reel 17 in synchronization with the displacement in a direction A of the carriage 11. More particularly, the ink ribbon 12 extracted from the supply reel 13 passes between the thermal recording head 16 and the recording sheet 15 to be pressed against the recording sheet and selectively heated by the thermal recording head 16, and is then wound on the take-up reel 17.

The ink ribbon cassette 10 is provided, in the rear portion thereof, with a discriminating part 18 for discriminating the color of the ink ribbon housed therein. The discriminating part 18 is composed of notches selectively positioned according to the color of the ink ribbon, and, in the illustrated example, is composed, from right to left, of a recess 18a, a non-recessed part 18b and a recess 18c. Said discriminating part 18 faces a detector 20 of 3 bits, composed of three parallel microswitches, which is thus capable of discriminating 8 colors. The discriminating part 18, composed of a combination of recesses in the present embodiment, may also be composed of projecting parts, and the detector may likewise be composed of optical sensors. Furthermore, instead of such morphological structures as recesses or projections, there may be employed bar codes or reflecting patterns that can be detected by optical sensors as a change in the reflected light. The color of the ink ribbon detected by the detector 20 is stored, as a color signal indicating the currently recordable color, in a color discriminating circuit 21 constituting memory means. Said detector 20 is also mounted on the carriage 11. There is also provided a control circuit 22 serving as control means for overall control for recording.

A printing instruction 24 causes the recording information consisting of a pattern signal indicating the character or symbol to be printed and a color signal indicating the print color of said character or symbol to be read from an unrepresented memory at a determined timing and to be supplied to the control circuit 22.

Thus, in response to the mounting of the ink ribbon cassette 10 of a certain color on the carriage 11, the detector 20 detects said color and sends a corresponding electric signal to the color discriminating circuit 21.

The color discriminating circuit 21 identifies and stores the color of the ink ribbon from the electric signal supplied from the detector 20, and supplies the information of said color to the control circuit 22.

If the recording information supplied in response to the printing instruction 24 contains a color signal which coincides with that stored in the color discriminating circuit 21, the control circuit 22 supplies the pattern signal of the recording information to the thermal recording head 16 for effecting the printing operation.

After said recording operation, the control circuit 22 advances the carriage 11 in the direction A by one digit while the next recording information is received. After said carriage movement, the color signal of the recording information supplied in response to the printing instruction 24 is compared with the color signal stored in the color discriminating circuit 21, and, if the two coincide each other, the pattern signal of said recording information is supplied to the thermal recording head 16 for effecting the recording operation. On the other hand, if the color signal of the recording information is different from that stored in the color discriminating circuit 21, the corresponding pattern signal of the recording information is excluded from the printing operation and is therefore not supplied to the thermal recording head 16 but retained, and a similar comparison is made on the next recording information after the carriage is advanced by a digit without printing operation. The above-described recording operation is repeated over the entire width of the recording sheet 15, thus completing the recording with a first color, whereupon the control circuit 22 provides a display on a display unit 23 serving as alarm means, in order to advise the operator to change the ink ribbon cassette to another.

Upon replacement of the ink ribbon cassette, the color of the ink ribbon is detected by the detector 20 in the same manner as explained before, and the recording information of the same color is selected from those previously received and retained, and supplied to the thermal recording head 16 for effecting the recording operation of the newly selected color over the entire width of the recording sheet.

In case it is identified that the recording information supplied to the control circuit 22 in response to the printing instruction 24 does not contain the information of a color matching the color of the ink ribbon in the ink ribbon cassette 10 mounted on the carriage 11, the control circuit 22 immediately indicates, on the display unit 23, a message to request the exchange of the cassette. The multi-color recording is obtained when all the colors contained in the recording information are recorded by repeating the above-described procedure.

Figure 5:
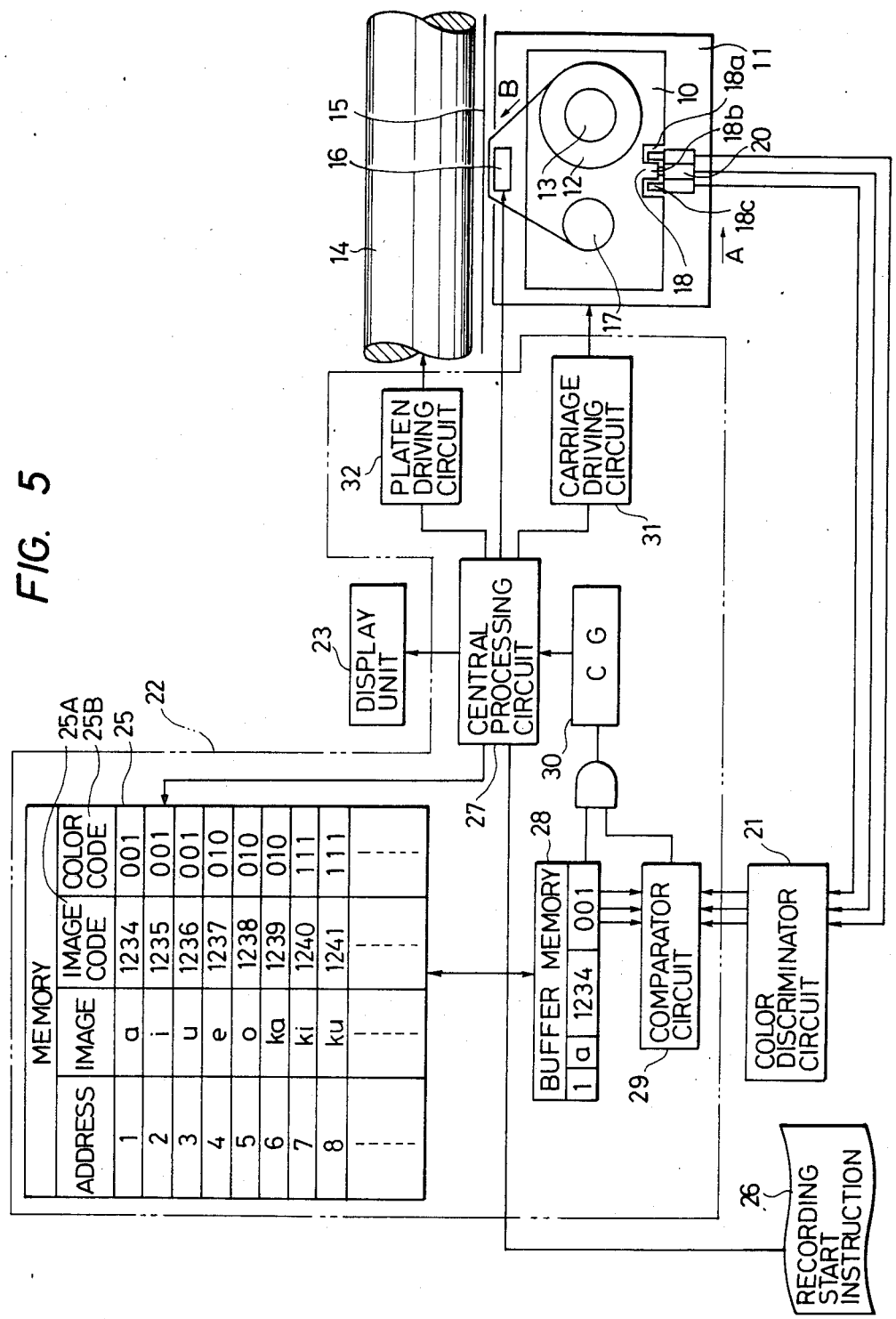
FIG. 5 is a more detailed diagram of the embodiment shown in FIG. 4.

For further describing the present invention, reference is now made to FIG. 5 showing the control circuit 22 in greater detail, wherein the same components as those in FIG. 4 are represented by same numbers.

An erasable first memory 25, serving as memory means for the recording information, stores the pattern signals and the color signals respectively in a pattern code memory area 25A and in a color code memory area 25B. In response to a recording start instruction 26, the recording information consisting of pattern signals and color signals is read at determined timings from the first memory 25 according to readout signals from a central processing circuit 27, and are stored in a buffer memory 28 constituting a second memory for temporarily storing said recording information. A comparator circuit 29, constituting comparing means, compares the color signal stored in the color discriminating circuit 21 and indicating the color of the ink ribbon 12 in the ink ribbon cassette 10 with the color signal of the recording information transferred from the first memory 25 to the buffer memory 28, and, only if the two coincide with each other, the pattern signal is supplied to a character generator 30 which in turn supplies a character pattern to the central processing circuit 27. Said central processing circuit 27 energizes the thermal printing head 16 according to the supplied character pattern, thus effecting the recording operation. After said recording operation, the carriage 11 is moved in the direction A by a digit, by means of an unrepresented motor driven by a carriage driving circuit 31. The recording information after recording is transferred again, as blank data, from the buffer memory 28 to the first memory 25, and the recording information of a next address is transferred to the buffer memory 28, and a comparison is made again on the signal stored in the color discriminating circuit 21 and the color signal of said next recording information.

In case the color signal of the recording information stored in the buffer memory 28 not coincide with the color of the ink ribbon 12 detected by the detector 20, the recording operation in the present digit is prohibited and the recording operation proceeds to a succeeding digit. The above-mentioned recording information is transferred again to the memory 25 and stored therein. At the same time a blank signal is supplied to the character generator 30, which in turn supplies a blank pattern to the central processing circuit 27. In response thereto the central processing circuit 27 deactivates the thermal recording head 16 and also deactivates an unrepresented ink ribbon driving motor or the like to interrupt the movement of the ink ribbon 12, and the carriage 11 is advanced by a digit in the direction A. In this manner the ink ribbon is advanced only in synchronization with the recording operation, whereby ink ribbon consumption is minimized.

The above-described operation is conducted in succession until all the information corresponding to the color of the ink ribbon of the cassette currently mounted on the carriage, among the recording information stored in the memory 25, are recorded. When the carriage reaches the right-hand end in the illustration, the carriage 11 automatically returns to the left-hand end and a platen driving circuit 32 drives an unrepresented motor to rotate the platen 14 to advance the recording sheet by a line, whereupon the recording operation is again continued.

FIG. 6 shows the content of the first memory 25 after the completion of the recording with the first color. Upon completion of the recording with the first color as described above, the platen driving circuit 32 inversely rotates the platen 14 to return the recording sheet 15 to the initial recording position, and the display unit 23 indicates an instruction for the operator to change the ink ribbon cassette 10 to another cassette.

When the ink ribbon cassette is replaced, the detector 20 discriminates the discriminating part 18 of the cassette 10 as explained before, and the color of the ink ribbon is stored in the color discriminating circuit 21. Thereafter the recording information remaining in the memory 25 is recorded through the process described above. This procedure is repeated until all the recording information stored in the memory 25 is recorded.

In this manner the multi-color recording is achieved by the use of plural ink ribbon cassettes of different colors and by recording the recording information alone corresponding to the ink ribbon of a particular color in an ink ribbon cassette at a time, through the use of a simple mechanism and without the waste in the conventional ink ribbons.

In the foregoing description the display unit 23 only provides a message for instructing the replacement of the cassette, but it is also possible to indicate a message, instructing the mounting of the cassette of a particular color, by the central processing circuit 27 by means of reading the color signal contained in the recording information stored in the memory 25.

Although the foregoing embodiment is limited to the case of a thermal transfer printer, the present invention is applicable also to other printers such as an impact printer utilizing similar ink ribbon cassettes, an impact printer utilizing ink rollers or an ink jet printer in which liquid inks of different colors are stored in separate cassette containers. Stated in a more general manner, the present invention is applicable to a printer or a recording apparatus in which recording materials are deposited by a recording head onto a recording sheet according to the recording information, wherein supply means such as supply cassettes for feeding said recording materials are exchanged for different colors.

What we claim is:

1. A multi-color recording apparatus comprising:
    feeding means for feeding a recording material of a determined color;
    recording means for depositing the recording material supplied from said feeding means onto a recording sheet in a pattern corresponding to recording information;
    detecting means for detecting the color of the recording material supplied from said feeding means;
    control means for comparing color information contained in the recording information with the result of detection by said detecting means and, when there is a lack of of coincidence therebetween, prohibiting the recording operation by said recording means; and
    alarm means for requesting that said feeding means be changed to another feeding means of a different color when all the recording information of the color detected by said detecting means has been recorded.

2. A multi-color recording apparatus according to claim 1, wherein said control means is adapted, when recording information containing a color coinciding with the result of detection of said detecting means is followed by recording information containing another color not coinciding with said result, to skip said latter recording information containing the non-coinciding color and to record the succeeding recording information containing coinciding color.

3. A multi-color recording apparatus according to claim 1, wherein said feeding means is an ink ribbon cassette, and said recording means is a thermal recording head.

4. A multi-color recording apparatus comprising:
    feeding means for feeding a recording material of a determined color;
    recording means for depositing the recording material supplied from said feeding means onto a recording sheet in a pattern corresponding to recording information;
    detecting means for detecting the color of the recording material supplied from said feeding means;
    carrying means for supporting and moving said feeding means, said recording means and said detecting means with respect to the recording sheet;
    control means for comparing the recording information with the result of detection by said detecting means and moving said carrying means to a position corresponding to recording information of a color the same as that detected by said detecting means to effect recording with that color at said position; and
    alarm means for requesting that said feeding means be changed to another feeding means of a different color when all the recording information of the color detected by said detecting means has been recorded.

5. A multi-color recording apparatus comprising:
    recording means for recording on a recording sheet according to recording information containing color information;
    first memory means for storing plural recording information;
    second memory means for reading recording information in successive manner from said first memory means and storing the recording information;
    third memory means for storing a color to be recorded said recording means; and
    control means comprising comparator means for comparing the color information of the recording information stored in successive manner in said second memory means with the color information stored in said third memory means, and adapted to cause, when the comparison indicates coincidence, said recording means to record the recording information and to erase the recording information from said first memory means.

6. A multi-color recording apparatus according to claim 5, wherein said recording means comprises feeding means for feeding a recording material of a determined color and a recording head for depositing the recording material supplied from said feeding means onto the recording sheet in a pattern corresponding to the recording information, and wherein said apparatus further comprises detecting means for detecting the color of the recording material supplied from said feeding means, and wherein said third memory means is adapted to store the result of detection of said detecting means.

7. A multi-color recording apparatus according to claim 6, further comprising alarm means for requesting that said feeding means be changed to another feeding means when all the recording information containing color information coinciding with the color stored in said third memory means has been recorded.

8. A multi-color recording apparatus according to claim 5, further comprising carrying means for supporting and moving said recording means, wherein said recording means is moved at each read out of the recording information, until recording information resulting in coincidence in said comparator means is supplied to said second memory means.

9. A multi-color recording apparatus comprising:
recording means for recording on a recording sheet according to recording information containing color information;
first memory means for storing plural recording information;
second memory means for reading recording information in successive manner from said first memory means and storing the recording information;
detecting means for detecting a color to be recorded by said recording means;
third memory means for storing the result of the detection by said detecting means; and
control means comprising comparator means for comparing the color information of the recording information stored in successive manner in said second memory means with the color information stored in said third memory means, and adapted to cause, when the comparison indicates coincidence, said recording means to record the recording information.

10. A multi-color recording apparatus according to claim 9, wherein said recording means comprises feeding means for feeding a recording material of a determined color and a recording head for depositing the recording material supplied from said feeding means onto the recording sheet in a pattern corresponding to the recording information, wherein said detecting means detects the color of the recording material supplied from said feeding means.

11. A multi-color recording apparatus according to claim 10, further comprising alarm means for requesting that said feeding means be changed to another feeding means when all the recording information containing color information coinciding with the color stored in said third memory means has been recorded.

12. A multi-color recording apparatus according to claim 9, further comprising carrying means for supporting and moving said recording means, wherein said recording means is moved at each read-out of the recording information until recording information resulting in coincidence in said comparator means is supplied to said second memory means.

13. A multi-color recording apparatus comprising:
recording means for recording on a recording sheet according to recording information containing color information;
first memory means for storing plural recording information;
detecting means for detecting a color to be recorded by said recording means;
second memory means for storing the result of the detection by said detecting means; and
control means comprising comparator means for comparing the color information of the recording information stored in said first memory means with the color information stored in said second memory means, and adapted to cause, when the comparison indicates coincidence, said recording means to record the recording information.

14. A multi-color recording apparatus according to claim 13, wherein said recording means comprises feeding means for feeding a recording material of a determined color and a recording head for depositing the recording material supplied from said feeding means onto the recording sheet in a pattern corresponding to the recording information, wherein said detecting means detects the color of the recording material supplied from said feeding means.

15. A multi-color recording apparatus according to claim 14, further comprising alarm means for requesting that said feeding means be changed to another feeding means when all the recording information containing color information coinciding with the color stored in said second memory means has been recorded.

* * * * *